United States Patent [19]

Bachelder et al.

[11] 4,004,601
[45] Jan. 25, 1977

[54] QUICK CLOSING EMERGENCY VALVE

[75] Inventors: Patrick Eugene Bachelder, Allen; William David Sumner, Mc Kinney, both of Tex.

[73] Assignee: Fisher Controls Company, Inc., Marshalltown, Iowa

[22] Filed: Oct. 2, 1975

[21] Appl. No.: 619,134

[52] U.S. Cl. .................................. 137/77; 74/2; 251/74
[51] Int. Cl.² .................................... F16K 17/38
[58] Field of Search ................ 251/66–69, 251/72, 73, 74, 239–241, 246, 251, 263; 137/75, 76, 77; 74/2

[56] References Cited
UNITED STATES PATENTS

| 1,359,035 | 11/1920 | Crocker | 137/77 |
| 1,944,401 | 1/1934 | Callaway | 251/230 X |
| 2,875,617 | 3/1959 | Murphy | 74/2 |

*Primary Examiner*—Alan Cohan
*Assistant Examiner*—Richard Gerard
*Attorney, Agent, or Firm*—James C. Bolding

[57] ABSTRACT

A valve mechanism is disclosed comprising valve body means with a fluid flow passage communicating an inlet and an outlet. A valve for controlling the flow of fluid through the fluid flow passage is connected to a stem which extends outwardly from the valve body. Handle means externally secured to the stem include a cam operable against the valve body for actuating the valve away from a seat within the valve body. A shut-off spring functions to urge the valve toward its valve seat. Cooperating latching means are provided on the handle means and stem to lock the parts with less than 90° rotation of the handle means. Release means cooperate with the latching means to free the handle means for rotation and permit the stem to move so that the main spring can close the valve. The handle, latching means, and stem are arranged to rotate so as to permit actuation of the handle in any position about 360° of the axis of rotation of the stem. Preferably, the latch incorporates a fusible member that will yield in the event a predetermined temperature is exceeded to permit release of the latch from the latch hook and enable the valve to be seated against the valve seat. The cooperating latching means will self-latch in operation upon actuation of the handle means. The release means may be mounted on the latch or pivoted on the stem and adapted to actuate the latch.

17 Claims, 6 Drawing Figures

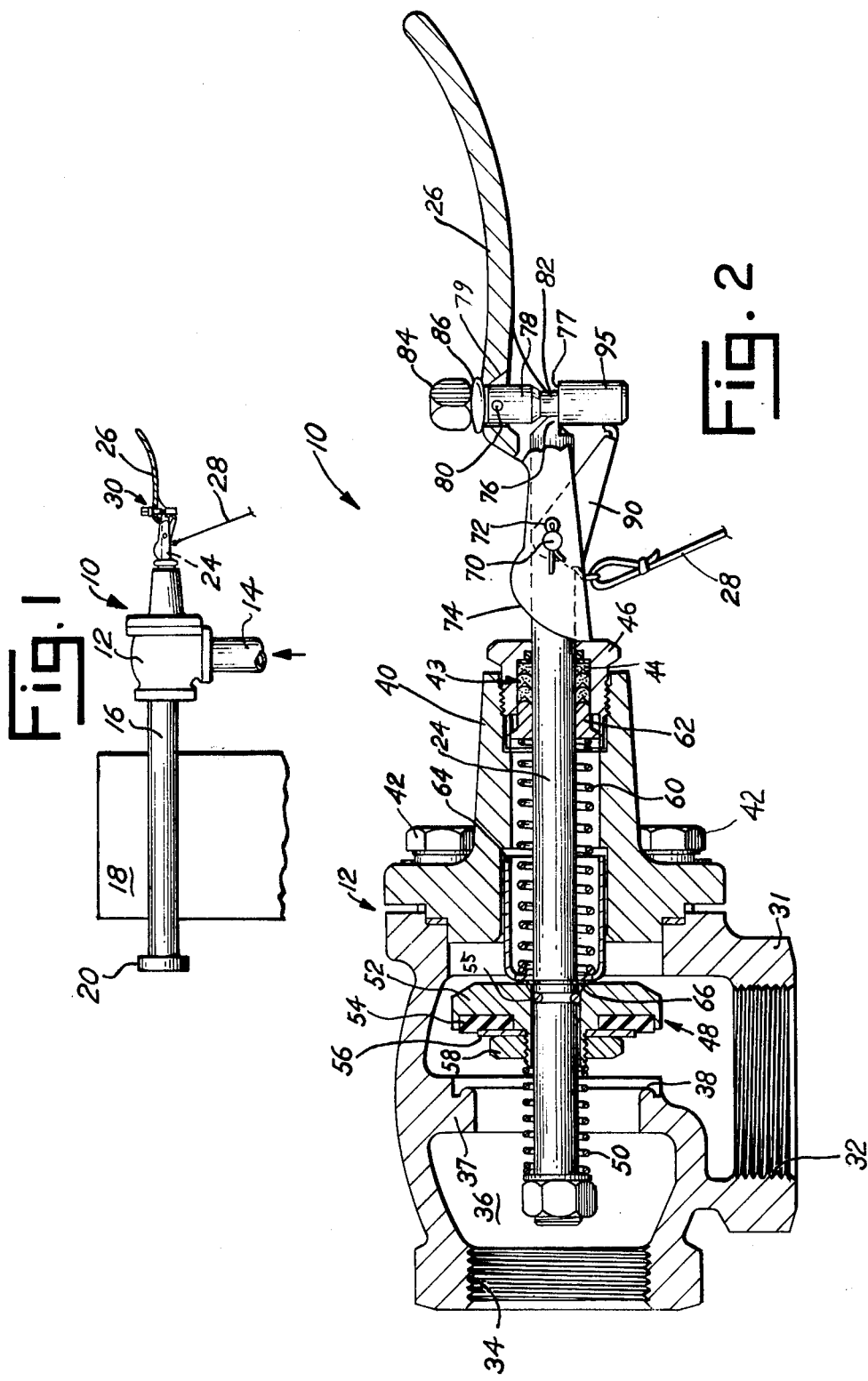

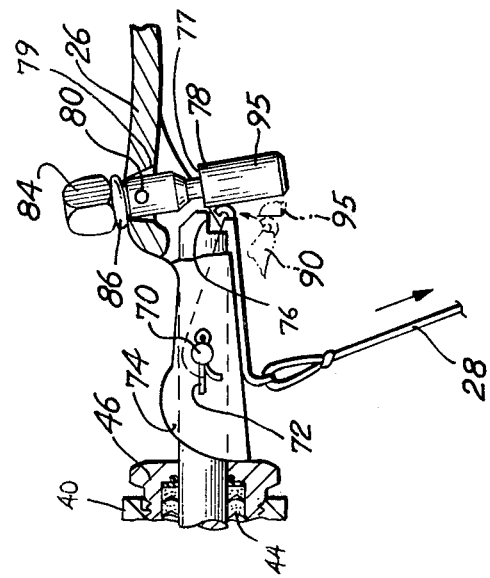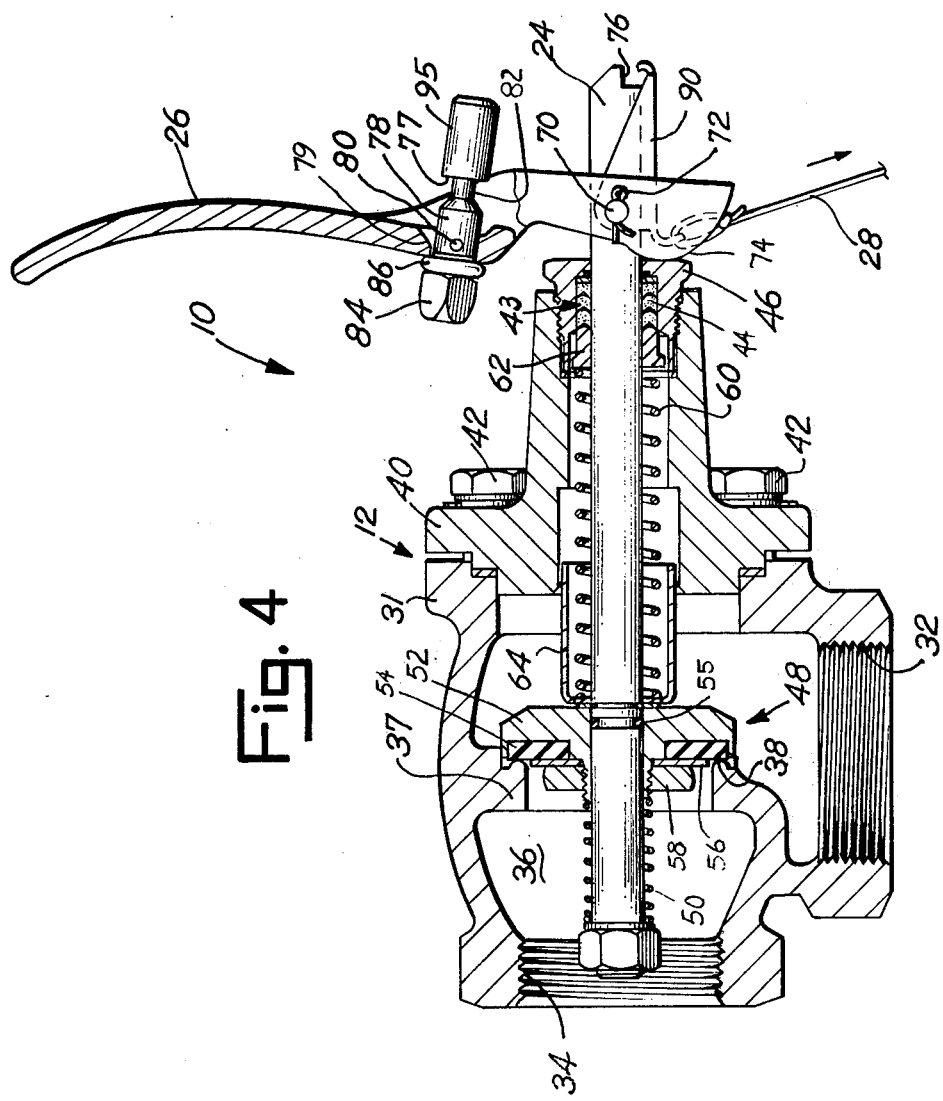

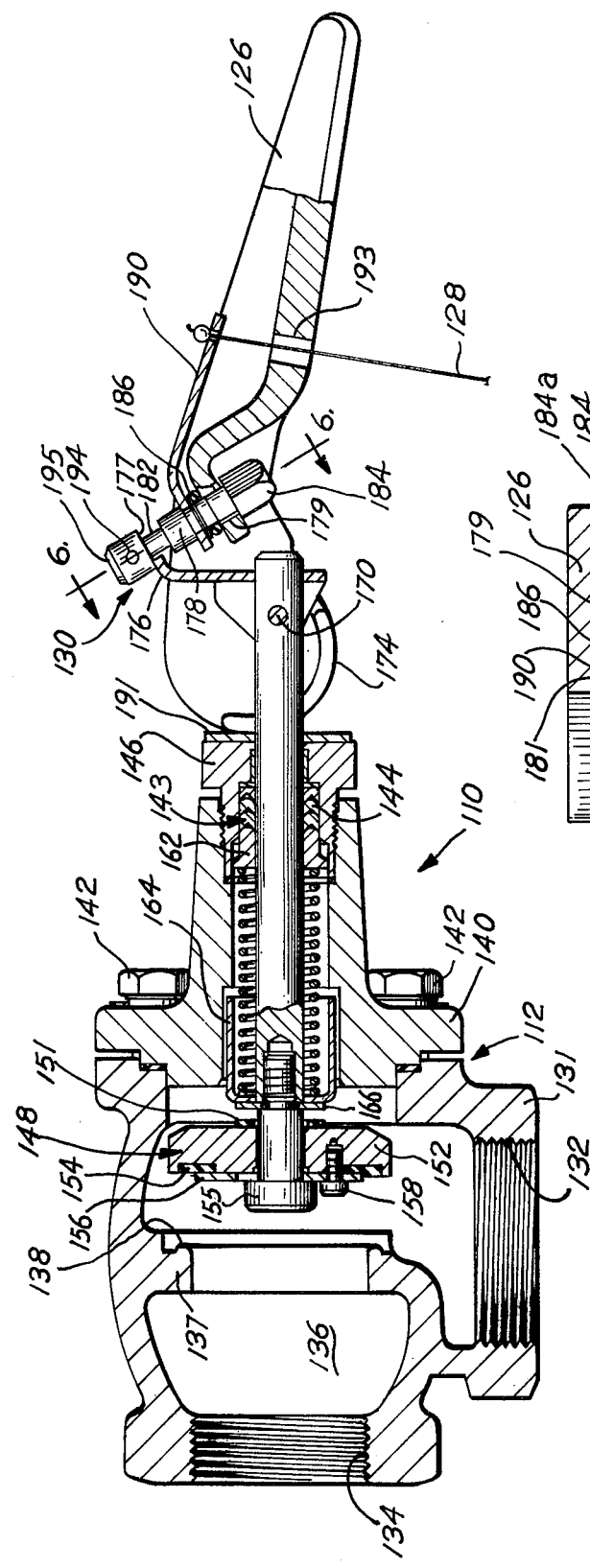

QUICK CLOSING EMERGENCY VALVE

FIELD OF THE INVENTION

The present invention relates to a quick closing emergency valve mechanism and, more particularly, to a handle operated, latch-open, quick closing emergency valve mechanism employed in transfer lines or hose lines connected to tanks in a liquified petroleum gas installation.

BACKGROUND OF THE INVENTION

Tank explosions in bulk plant installations handling volatile materials such as liquified petroleum gas and liquid ammonia may be caused by the inability of a tank's safety relief valve system to relieve enough pressure at an adequate rate. Tank failure may be caused by an intense fuel-fed fire surrounding the tank for an extended period. As the tank continues to be heated by the fire, the steel in the unwetted portion of the tank may be weakened by overheating, and thereby, cause tank failure.

These fires may be caused by excessive spills of materials such as liquified petroleum (LP) gas, which is easily ignited. Once ignited, the fire can eventually heat the tank enough to cause tank failure if the spilling of the material is left unchecked. These spills are generally caused by breaks or cracks in the transfer line or hose, as when a driver moves a truck away from the point of filling without disconnecting the hose. An excess flow valve in an internal flow control valve can shut off the flow of the escaping material if the break is large enough to actuate the excess flow shut-off valve. But should there be only a small crack or break in the material transfer line, large enough to create a serious hazard, but not large enough to shut the excess flow valve, the material will continue to leak and may cause a fire and possibly an explosion.

Several methods have been proposed for insuring safety in emergency situations such as those mentioned above in bulk plants handling LP gas or liquid ammonia ($NH_3$). One proposed method utilized an elaborate sprinkler system to keep tanks containing volatile fuels cool in the event of fire in an attempt to prevent tank failure. Should a fire occur near the tanks, water would be sprayed on the tanks until the fire could be extinguished. This proposed system lacks any provision to terminate the flow of material fueling the fire.

Another method was to bury the storage tanks to prevent fire from reaching the external portions of the tank. This method is costly and only treats the effect of the emergency situation and not the cause.

A third proposed method was to cover above ground storage tanks with a heat resistant material. Since the tanks are relatively large, this proposal was relatively costly, and, in addition, did not obviate the cause of the fire or stop the flow of fuel feeding such fire.

The foregoing proposals did not correct the emergency situation. The use of a quick-closing valve, as shown in St. Clair U.S. Pat. No. 2,538,806 or a safety flow valve as shown in Dyer et al. U.S. Pat. No. 3,164,359 in association with a storage tank would not solve the problem resulting from an emergency situation in the transfer line or hose external of the storage tank.

SUMMARY OF THE INVENTION

An object of the present invention is to provide a quick closing emergency valve mechanism for use in the transfer line to a storage tank, for example, in a bulk plant installation, that will overcome the deficiencies and disadvantages of prior arrangements.

Another object of the present invention is to provide an improved quick closing emergency valve mechanism which incorporates handle means pivotally secured to a valve stem for camming open a valve within the valve mechanism, with cooperating latching mechanism on the handle and stem for holding the valve open, away from its valve seat, and with the components being constructed and arranged so as to permit operation from any position around the axis of the valve stem.

A further object of the present invention is to provide an improved quick closing emergency valve mechanism which incorporates a handle operatively pivoted on a valve stem and retained in selected position relative thereto by means of cooperating latching means, with a heat fusible member being provided in the latching means and releaseable upon heating above a predetermined value to permit the handle to pivot and thereby permit a shut-off spring to snap close the valve against its seat.

Another object of this invention is to provide an improved quick closing emergency valve mechanism having an external handle pivoted on a valve stem to provide a self-latching of a latch and a latch hook of releasable cooperating latching means upon rotation of the handle to hold the handle in a position to retain the valve in the valve mechanism open.

Yet another object of the present invention is to provide an improved quick closing emergency valve mechanism with handle means having a cam thereon operable to actuate a stem so as to move a valve away from its seat against the bias of a spring and latching means between the handle means and stem, said quick closing valve mechanism being adapted to be operated easily from a remote position to release the latching means and enable a shut-off spring to bias the valve to a closed position.

Other objects and advantages of the present invention will be made more apparent hereinafter.

BRIEF DESCRIPTION OF THE DRAWING

There is illustrated in the attached drawing presently preferred embodiments of the present invention, wherein like numerals refer to like elements in the different views and wherein:

FIG. 1 illustrates a quick closing emergency valve mechanism embodying the present invention disposed in a fluid transfer line;

FIG. 2 is a vertical cross-section of a quick closing emergency valve mechanism embodying the present invention showing the components in the valve open position;

FIG. 3 is a detail cross-sectional view of the latching means showing the beginning of the release action;

FIG. 4 is a vertical cross-section of the quick closing emergency valve mechanism of FIG. 2, with the components shown in the valve closed position;

FIG. 5 illustrates a modified quick closing emergency valve mechanism, embodying principles of the present invention; and FIG. 6 is a detailed view of the handle means and cooperating latch means taken generally along the line 6—6 of FIG. 5.

DETAILED DESCRIPTION OF THE PREFERRED EMBODIMENTS OF THE PRESENT INVENTION

Referring to FIG. 1, there is illustrated a typical installation for the quick closing emergency valve mechanism 10 of the present invention. The valve body means 12 is adapted to be connected in a transfer line that includes an inlet pipe 14 and an outlet pipe 16. The outlet pipe 16 may pass through bulkhead 18 and be provided with a hose connection 20 or the like so as to enable communication to a tank truck or other tank in the bulk plant installation. Secured to the stem 24, rotatably supported within and extending outwardly from the valve body means 12 of valve mechanism 10 for actuating the valve member therein is a handle means 26. The handle means 26 is constructed and arranged so as to be rotatable with the stem 24 and thereby, actuable from any position 360° about the axis of the valve stem 24. A control cable 28 made from wire, cord or like non-flammable material comprises actuating means that is adapted to be operated from a remote position so as to release the cooperating latch means 30 between the handle means 26 and stem 24 and permit the handle means to rotate and allow the stem 24 to move inwardly quickly into the valve body 12 and thereby, permit the valve within the valve body means 12 to be biased closed by a shut-off spring.

Turning to FIGS. 2, 3 and 4, there is better illustrated the valve mechanism 10 embodying principles of the present invention. The valve body means 12 includes a main body 31 having an inlet 32 that communicates with outlet 34 via a fluid flow passage 36. Valve seat 38 is defined on the web 37 within the main body 31. The valve body means 12 may be of the angle type as shown or it can be a globe type.

Valve body means 12 also includes a bonnet 40 that is suitably connected to the main body portion 31, for example, by means of bolts 42. The stem 24 is slideably and rotatably supported in the valve body means 12 by the packing means 43 retained in the upper portion of the bonnet 40 and the stem guide 64 intermediate the ends of the stem. The packing means 43 may comprise a plurality of Chevron or like packing rings 44 disposed about stem 24 and packing nut 46 and packing sleeve 62 on opposite sides of rings 44. Packing nut 46 may be threaded to bonnet 40 and packing sleeve 62 is loosely carried on stem 24 for axial movement. Sleeve 62 can be biased by spring 60 to compress the packing rings 44 and enhance sealing about the stem 24.

The excess flow valve 48 is carried slideably on the stem 24 and is biased away from the valve seat 38 by means of the excess flow spring 50. As shown in FIGS. 2 and 4, the excess flow valve 48 incorporates a body portion 52 having an annular recess for receiving a resilient seat member 54. The resilient seat member 54 is retained in place by means of the washer 56 and the lock nut 58 secured to an externally threaded reduced-diameter portion of valve body 52. An equalizing passage is provided between the outer diameter of stem 24 and the inner diameter of the opening through body portion 52. O-ring 55 closes the equalizing passage with the valve body 52 in the position shown in FIG. 2.

Disposed about the valve stem 24 is a main shut-off spring 60. The shut-off spring 60 bears at its upper end upon packing sleeve 62 and at its lower end against the cage or stem guide 64 which abuts the retaining ring or washer 66 affixed on the stem 24.

In the event that the pipe or line downstream of valve mechanism 10 experienced a break or crack or upon the occurrence of another event which resulted in excess flow, the resulting pressure differential on opposite sides of valve 48 overcomes the bias of spring 50 and valve 48 will be moved to engagement with valve seat 38 so as to close the fluid flow passage 36.

The handle means 26 is pivotally supported on the stem 24 by means of a pivot pin 70 that is retained in place by the cotter key 72. The handle 26 includes a smoothly contoured cam portion 74 on the lower end thereof that is adapted to abut the top of the packing nut 46 on the valve body means 10. With the hendle 26 in the position shown in FIG. 2, the spring 60 is compressed so as to permit the valve assembly 48 to function as an excess flow valve. The handle means 26 is retained in the position shown in FIG. 2 before the center position (or stated differently, before 90° rotation) by means of the cooperating latch means 30, which comprises a latch hook 76 defined on the upper end of the stem 24 and a latch 78 on the handle 26. The latch 78 is basically a bolt-like member that extends through a contoured opening in handle 26 that is of a larger diameter than the the portion of the latch 78 received therein so as to permit limited pivotal movement of the latch 78 within opening 79. Latch 78 has an enlarged portion 95 at one end. An annular peripheral recess 82 is defined on the latch 78 intermediate its length. The latch hook 76 on the end of the stem 24 abuts a shoulder 77 forming one side of recess 82, so as to retain the handle 26 in the position shown in FIG. 2, with the spring 60 within the valve body means 10 compressed. Pin 80 extends beyond the exterior surface of latch 78 and cooperates with a slot or recess in handle 26 to help retain the latch 78 in place on the handle 26. The end of the latch 78 is threaded so as to receive the nut 84 that is secured to the latch by heat fusible means, as will be explained more fully hereinafter. The nut 84 cooperates with the threaded end of latch 78 and pin 80 to retain the latch in opening 79 in handle 26 and bears upon a resilient O-ring 86 so as to accommodate some motion of the latch 78 relative to the handle 26. The latch 78 can pivot within opening 79 upon actuation by release lever 90, to release the latch hook 76 from engagement with shoulder 77. The handle means 26 is self-latched prior to a 90° position or center position. Thus, when the latching means 30 is released, upon movement of release lever 90, spring 60 can quickly bias the valve 48 to the closed position as shown in FIG. 4 and terminate fluid flow through the transfer line in which valve mechanism 12 is located.

In the event of a crack or break in the transfer line downstream of the valve mechanism 10, when enough material escapes to be hazardous but not enough to actuate the excess flow valve 48, an operator could manually close the valve 48 by actuating release lever 90 to free the cooperating latch and latch hook and enable the handle 26 to pivot counterclockwise as viewed in FIGS. 2 and 4. When the cooperating latching means 30 is released, the handle 26 is free to swing and thereby permit the valve stem 24 to move quickly toward the valve seat under the bias of the spring 60. The spring 60 would urge the valve 48 into engagement with valve seat 38. It is to be noted that the spring 60 serves a dual purpose—it closes the valve 48 against its seat 38 in an emergency condition, and also, biases the packing sleeve 62 to compress packing 44 and prevent leakage of material through the packing 44.

The release lever 90 which is pivotally secured upon pin 70 is adapted to be actuated from a remote station by means of the non-flammable control cable, e.g., wire 28. Upon pulling of the remote control cable 28 as viewed in FIG. 2 (or upon manual actuation), the lever 90 would be pivoted counterclockwise to lift the latch 78 from the latch hook 76 to disengage the cooperating latch means (FIG. 3) and thereby permit the handle means 26 to pivot on the stem 24 and allow the stem 24 to move inwardly. The compressed spring 60 will expand and urge the valve 48 into sealing engagement with valve seat 38.

It will be noted that the movement of the handle 26 between latch position (FIG. 2) and unlatched position (FIG. 4) is through an arc of less than 90°. That is, the locked position of the handle 26 as shown in FIG. 2 is before the center position of the handle 26 relative to the stem 24 and body means 12. Therefore, as soon as the cooperating latching means 30 is released, the shut-off spring 60 will urge the stem 24 inwardly. The valve 48 will be seated against valve seat 38 as the spring 60 expands. Upon rotation of the handle means 26 from the position shown in FIG. 4 to that shown in FIG. 2, the stem 24 will be drawn outwardly compressing spring 60. When the latch hook 76 engages a shoulder 77 defined by the recess 82 of the latch 78, the handle 26 will be automatically locked. Initially, stem 24 will move relative to seated valve 48. The O-ring 55 will be moved from within the equalizing passage to a position outside the valve 48, permitting pressure equalization on opposite sides of the valve 48. Excess flow spring 50 will operate to open the valve 48.

In the event of a fire, in the immediate vicinity of the valve mechanism 10, the heat fusible material retaining the nut 84 on the latch 78 will melt upon reaching a predetermined temperature, for example 220° F, and the nut 84 will be moved from the latch 78. The heat fusible material may be lead, solder or the like material that is capable of retaining the parts together, but will yield when heated to produce the desired result. When the nut 84 slips off the latch 78, the handle 26 will be freed so as to permit rotation thereof counterclockwise as viewed in FIG. 2 and the spring 60 will bias the valve 48 to its seated position against the seat 38, as shown in FIG. 4.

Turning now to FIGS. 5 and 6, there is illustrated another embodiment of the present invention. Many components are similar between the embodiment of FIGS. 2 and 4 and that of FIGS. 5 and 6 and 100 series numerals will be used for like components in FIGS. 5 and 6. The quick closing emergency valve mechanism 110 includes a body means 112 that comprises main body 131 and bonnet 140. Within body 131 is an inlet 132 communicating with an outlet 134 by means of a fluid flow passage 136. The web 137 formed in the valve body 131 provides a valve seat 138 against which the valve 148 may abut. One of the differences between the embodiment of FIGS. 2 and 4 and that of FIG. 5 is that the embodiment of FIG. 5 does not incorporate an excess flow valve. The valve 148 comprises a body member 152 mounted for limited axial movement upon shoulder screw 155 that is secured to stem 124 and forms an extension thereof. Resilient seat 154, which may be made of rubber or like material, is disposed in a recess in body member 152 and held in place by means of washer or retainer 156 and screws 158. An annular bleed disc 151 is positioned between valve body member 152 and stem guide washer 166. There is an equalization passage between the outside diameter of shoulder screw 155 and the internal diameter of body member 152. The openings in the retainer 156 and disc 151 are constructed so as to permit fluid communication on opposite sides of the valve member.

Reference may be had to Summer et al. U.S. Pat. No. 3,844,312 for a more complete description of the equalization passage and operation thereof. Briefly, assume valve 148 is seated tightly against seat 138. Washer 166 is in contact with bleed disc 151 and the equalization passage is closed. As the valve stem 124 begins valve opening motion, washer 166 moves from bleed disc 151, and the equalization passage is opened. Pressure is equalized on opposite sides of the valve 148.

Another difference between the modification of FIGS. 5 and 6 and the embodiment of FIGS. 2 and 4 lies in the handle and the cooperating latch means between the handle and the stem. The handle 126 is pivoted on the stem 124 by means of the pivot 170. The cooperating latch means 130 includes a recess 182 in the latch 178 and a latch hook 176 affixed to the top of the stem 124. The latch 178 extends loosely through a contoured opening 179 within the handle 126 and is held in place by the cooperation between release lever 190, resilient O-ring 186 and nut 184, in such manner as to provide for limited pivotal movement of the latch 178 within the opening 179. The release lever or trigger 190 is comprised of a plate member having an opening therein for receiving the latch 178. On one surface, the release lever 190 abuts a shoulder 181 of the latch member 178, and on the other surface the release lever abuts an O-ring 186 which functions as a spring to center the latch 178, as well as a biasing member to help separate the latch 178 and nut 184 when the nut 184 is released from the latch upon melting of the heat fusible element therewithin.

Actuating means 128, which may be a non-flammable cable of wire, cord or the like, extends through the opening 193 and is affixed to the release lever or trigger 190. Upon pulling of the actuating means 128 from a remote location or upon manual actuation by the operator, the release lever 190 will act upon latch 178 (which has limited movement relative to handle means 126) to release shoulder 177 from engagement with latch hook 176. The handle 126 will be able to pivot about the pin 170 and as the cam 174 moves against the wear plate 191 on the top of the packing nut 146, the stem 124 will be drawn inwardly by the spring 160 to urge the valve 148 toward and against its seat 138. Essentially, the handle means 126 (and the handle means 26) are constructed and arranged so as to provide a snap-action closure when the cooperating latching means are released.

Turning to FIG. 6 there is better shown the thermally releasable latch 178. The recess 182 may be machined, or alternatively, an enlarged cylindrical member 195 may be secured on the shaft end of latch 178, for example, it can be pinned thereto by pin 194. The nut 184 comprises an external sleeve 184a joined to an internally threaded sleeve 184b by heat fusible material 184c. Sleeve 184b is threaded onto the external threads on the latch 178. The external surface of the sleeve 184b and the internal surface of the sleeve 184a are preferably smooth and are dimensioned so as to be spaced from one another. The space between the sleeves 184a and 184b is filled with a heat fusible material 184c, for example, lead or solder. The external surface of sleeve 184a is non-circular, for example, hexagonal, so that nut 184 can be threaded onto body of latch 178.

In use, should a fire envelope the valve mechanism 10 or should the temperature rise sufficiently in the area of the valve mechanism to melt the heat fusible material 184c, the sleeve 184a will slide off the sleeve 184b and the handle 126 will be free to rotate. Spring 160 will close the valve with a snap action.

It will be understood that the nut 84 has substantially the same internal construction as the nut 184.

Thus, there has been provided by the present invention an improved handle or lever operated latch-open quick closing emergency valve mechanism that incorporates relatively simple releasable latching means between the handle and the valve stem. The latching means are so arranged that when the valve is open for normal use, the parts will self-latch to retain the valve in the open position. Release means are actuated to free the cooperating latch means to permit the handle to pivot so that the shut-off spring can bias the valve closed. The latch includes a thermally responsive member that will yield in the event of heating above a predetermined temperature (caused, for example, by a fire) so as to permit release of the handle for pivotal movement relative to the stem. The main shut-off spring will urge the stem inwardly with a quick snap action to close the valve against its seat. This is true whether the valve body means incorporates an excess flow valve feature as in FIGS. 2 and 4 or whether the valve is affixed to the valve stem as in FIG. 5. The camming arrangement on the handle means is so arranged that there is no undue tension on the heat fusible element within the latch which might tend to release the latching means prematurely, for example, due to cold working. The construction of the handle means, cooperating latching means and releasing means and valve stem are such that the valve stem and parts carried thereon may be swiveled or rotated through 360°, thus enabling an operator to push or pull the handle means from any position around the valve so as to quickly close the valve in an emergency situation. The handle means may be similarly operated from a remote location.

While there has been shown and described presently preferred embodiments of this invention, it will be obvious to those skilled in the art that various changes and modifications may be made therein without departing from the invention, and therefore, it is intended in the appended claims to cover all such changes and modifications as fall within the true spirit and scope of the invention.

We claim:

1. A quick closing emergency valve mechanism comprising valve body means having an inlet and an outlet, a fluid flow passage in said valve body means communicating said inlet and said outlet, a valve seat in said valve body between said inlet and outlet, valve means adapted to engage said valve seat for terminating fluid flow through said flow passage, said valve means comprising a valve and an elongated stem secured thereto and extending from the valve body, spring means for biasing the valve toward the valve seat, handle means pivotally secured to the stem, said handle means having a cam portion operable against the valve body means for actuating the valve away from the valve seat, cooperating latching means on the handle means and stem to retain the valve away from the valve seat, and release means actuated to release the cooperating latch means so as to permit the spring means to bias the valve to the valve seat to terminate flow through the fluid flow passage.

2. A valve mechanism as in claim 1 wherein the valve stem is journalled in the valve body for reciprocable movement and for rotational movement, whereby the handle means may be positioned angularly about the axis of the elongated stem.

3. A valve mechanism as in claim 1 including actuating means operative to actuate the release means from a remote location.

4. A valve mechanism as in claim 1 wherein the latching means comprises a latch and a latch hook adapted to engage one another to retain the valve away from the valve seat and releasable to permit the spring means to bias the valve toward and to the valve seat.

5. A valve mechanism as in claim 4 wherein the latch is on the handle means and the latch hook is on the stem.

6. A valve mechanism as in claim 5 wherein the latch includes a heat fusible element that will melt when heated above a predetermined value to release the latch from the latch hook and thereby permit the handle means to move so as to enable the spring means to bias the valve to the valve seat.

7. A valve mechanism as in claim 4 wherein the latch and latch hook are engaged with one another when the cam means is short of center position so that upon release of the cooperating latch means the spring means will promptly actuate the valve to closed position against the valve seat.

8. The valve mechanism as in claim 7 wherein the latch has a recessed portion adapted to engage with the latch hook as the handle means is pivoted on the stem so as to move the valve away from the valve seat.

9. A valve mechanism as in claim 6 wherein the latch comprises a bolt-like member having threads at one end and a nut-like member secured to said threads by heat fusible material whereby when the heat fusible material melts, the nut-like member will be moved relative to the bolt-like member so as to release the handle means.

10. A valve mechanism as in claim 3 wherein the actuating means comprises a non-flammable cable.

11. A valve mechanism as in claim 4 wherein said release means includes a release lever for disengaging the latch and latch hook.

12. A valve mechanism as in claim 11 wherein the latch is positioned in an opening in the handle means and the release lever is retained on the latch, and an O-ring is provided on the latch between the release lever and the handle means to permit relative movement between the latch and handle means.

13. A valve mechanism as in claim 8 wherein said release means includes release lever pivoted on the stem, said latch being mounted on the handle means so as to have limited movement, whereby upon pivoting of the release lever, the latch will be released from engagement with the latch hook.

14. A valve mechanism as in claim 13 wherein the release lever is secured to remote actuating means.

15. A valve mechanism as in claim 4 wherein the latch includes a nut releasably secured thereto by heat fusible means, the nut comprising an outer sleeve and an inner sleeve joined together by the heat fusible means, the inner sleeve cooperating with and being secured to the body of the latch, whereby when the heat fusible means melts, the outer sleeve will be released from the inner sleeve, the handle means will be freed for rotation, and the spring means will close the valve with a snap-action.

16. A valve mechanism as in claim 2 wherein a stem guide is provided about the stem within the valve body means, said stem guide cooperating with the interior of the valve body means to help guide the stem, packing means about the stem, said spring means abutting the stem guide at one end and the packing means at the other end.

17. A valve mechanism as in claim 16 wherein the packing means comprises a packing nut secured to the valve body means, packing rings, and a packing sleeve movable relative to the packing nut, said other end of the spring means bearing against the packing sleeve for compressing the packing rings and obviating leakage about the stem.

* * * * *